Oct. 8, 1940.  E. J. VON PEIN  2,217,208
WEIGHING AND RECORDING MECHANISM
Filed Jan. 28, 1938  10 Sheets-Sheet 1

INVENTOR
E. J. Von Pein
BY
W. M. Wilson
ATTORNEY

Oct. 8, 1940.  E. J. VON PEIN  2,217,208

WEIGHING AND RECORDING MECHANISM

Filed Jan. 28, 1938  10 Sheets-Sheet 2

FIG. 3.

INVENTOR
E. J. Von Pein
BY
ATTORNEY

Oct. 8, 1940.   E. J. VON PEIN   2,217,208
WEIGHING AND RECORDING MECHANISM
Filed Jan. 28, 1938   10 Sheets-Sheet 5

FIG. 6.

INVENTOR
E. J. Von Pein
BY
W. M. Wilson
ATTORNEY

Oct. 8, 1940.　　　　E. J. VON PEIN　　　　2,217,208
WEIGHING AND RECORDING MECHANISM
Filed Jan. 28, 1938　　　10 Sheets-Sheet 7

INVENTOR
E. J. Von Pein
BY
W. M. Wilson
ATTORNEY

Oct. 8, 1940. E. J. VON PEIN 2,217,208
WEIGHING AND RECORDING MECHANISM
Filed Jan. 28, 1938 10 Sheets-Sheet 8

INVENTOR
E. J. Von Pein
BY
W. M. Wilson
ATTORNEY

Oct. 8, 1940.   E. J. VON PEIN   2,217,208
WEIGHING AND RECORDING MECHANISM
Filed Jan. 28, 1938   10 Sheets-Sheet 9

INVENTOR.
E. J. Von Pein
BY
W. M. Wilson
ATTORNEY

Oct. 8, 1940.  E. J. VON PEIN  2,217,208
WEIGHING AND RECORDING MECHANISM
Filed Jan. 28, 1938  10 Sheets-Sheet 10

INVENTOR
E. J. Von Pein
BY
W. M. Wilson
ATTORNEY

Patented Oct. 8, 1940

2,217,208

UNITED STATES PATENT OFFICE 2,217,208

WEIGHING AND RECORDING MECHANISM

Edward J. Von Pein, Endicott, N. Y., assignor to International Business Machines Corporation, New York, N. Y., a corporation of New York Application January 28, 1938, Serial No. 187,502

7 Claims. (Cl. 234—5.4)

This case relates to a weighing scale for recording and registering weights.

The general object of the invention is to provide an improved weight recording and registering scale.

More specifically, an object is to provide novel means for sensing the load position of a load responsive member to convert such position into equivalent manifestations.

Further, this object is to convert the load position of a single member into a plural denominational order figure.

Another object is to provide for separate registrating of different classes of loads.

Still another object is to prevent registration of a load unless the scale has first reached equilibrium.

An object is also to prevent issue of a printed record of the weight unless the scale has first come to rest.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 22 is a timing diagram.

Weighing mechanism

Figure 1:
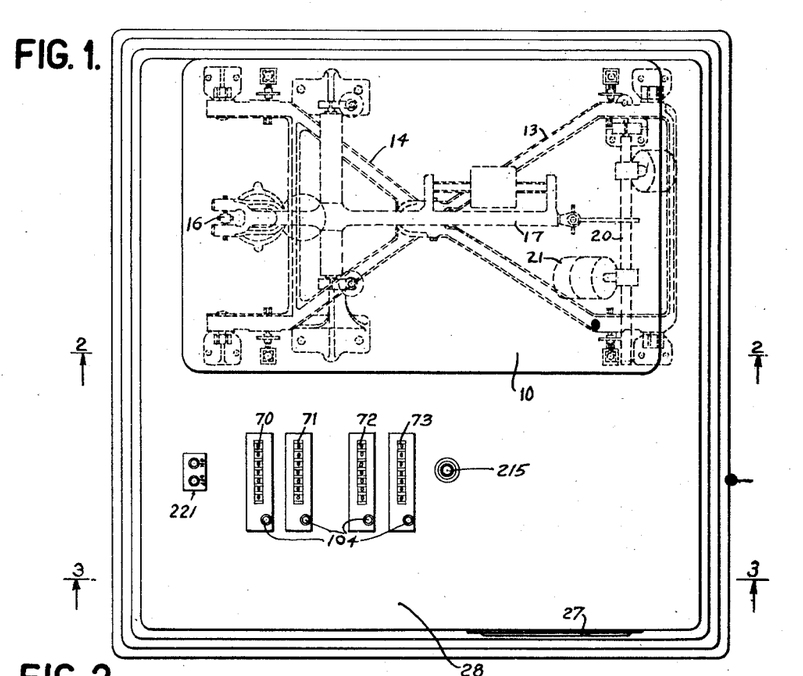
Fig. 1 is a plan view of the machine.
Figure 2:
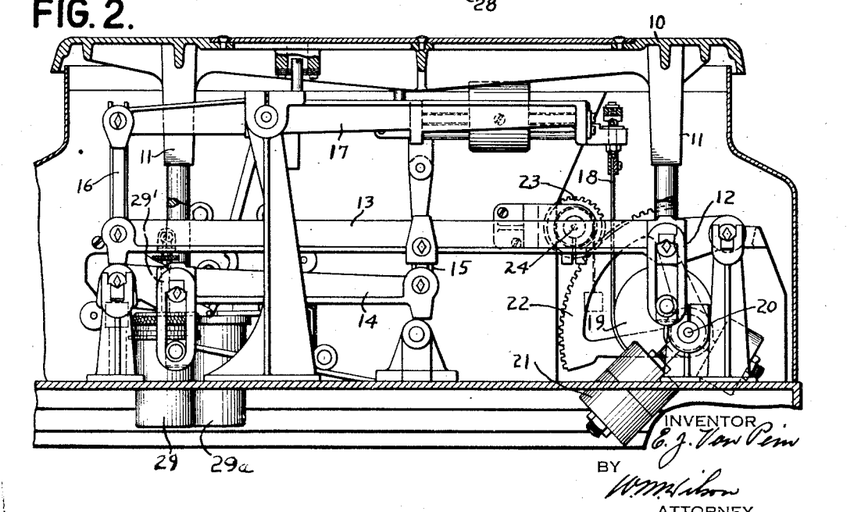
Figs. 2 and 3 are sections, respectively, along lines 2—2 and 3—3 of Fig. 1.

Referring to Figs. 1 and 2, the weighing scale comprises load platform or support 10 having legs 11 resting on links 12 suspended from base levers 13 and 14, interconnected by link 15. The nose end of lever 13 is connected by link 16 to upper lever 17, connected by dependent tape 18 to power cam 19 of pendulum shaft 20 carrying pendulum 21 and gear sector 22. The latter meshes with pinion 23 of indicator shaft 24, one end of which carries weight dial 25 read against a suitable fixed index through sight window 27 (see also Figs. 4 and 7) of outer casing or housing 28.

Base lever 13 is connected to plunger rod 29' of a dash pot or oil check 29, which is of the form disclosed in Patent No. 2,027,077, for checking vibration of the weighing mechanism and for sensing equilibrium or a condition of rest of the weighing mechanism, for a purpose which will be explained later.

A load placed on platform 10 causes base levers 13 and 14 to rock downwardly, lever 13 rocks lever 17 counterclockwise (Fig. 2), causing tape 18 to rock pendulum shaft 20 clockwise. Pendulum 21 comes to rest at an angle for balancing the load, while sector 22 rotates pinion 23, indicator shaft 24, and dial 25 to indicate the magnitude of the load.

For the purposes of the disclosure, the illustrated scale has a maximum capacity or weighing range of twenty-five pounds.

Selector mechanism

Selector mechanism controlled by the weighing mechanism is used to effect a mechanical representation of the load which is converted into operation of means auxiliary to the scale proper; in the present case, auxiliary printing and registering means.

Figure 3:
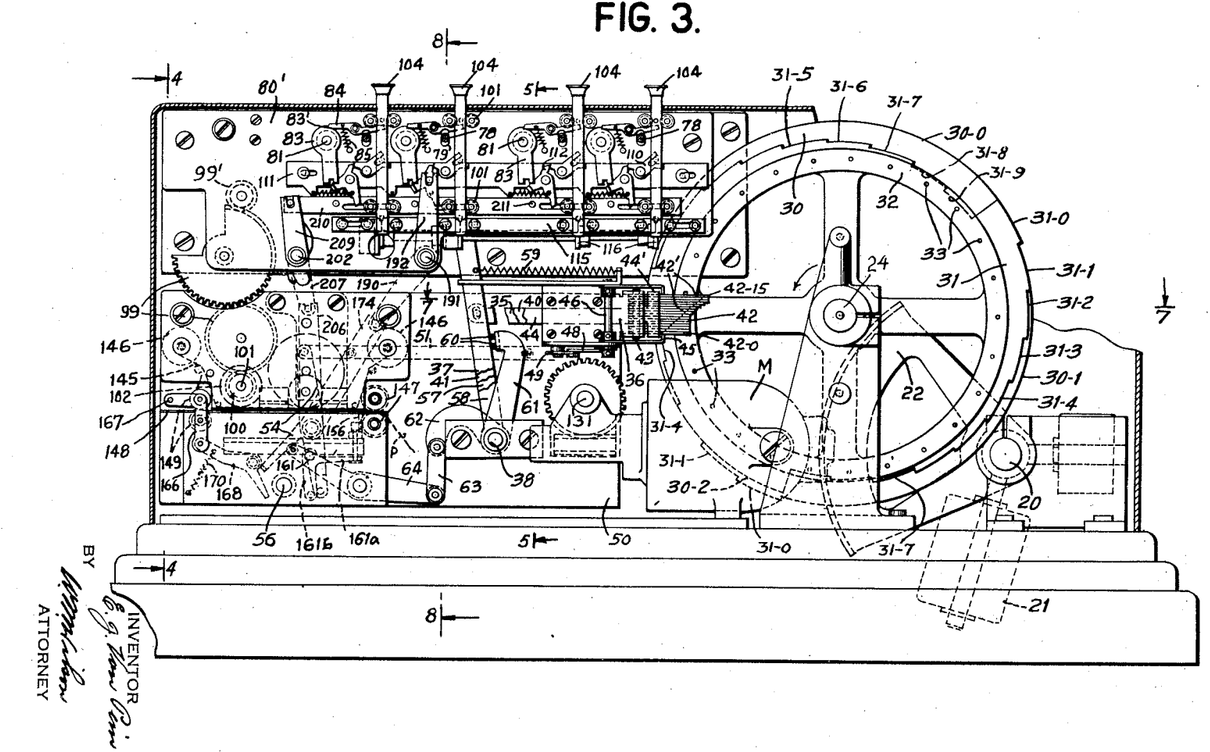
Figure 7:
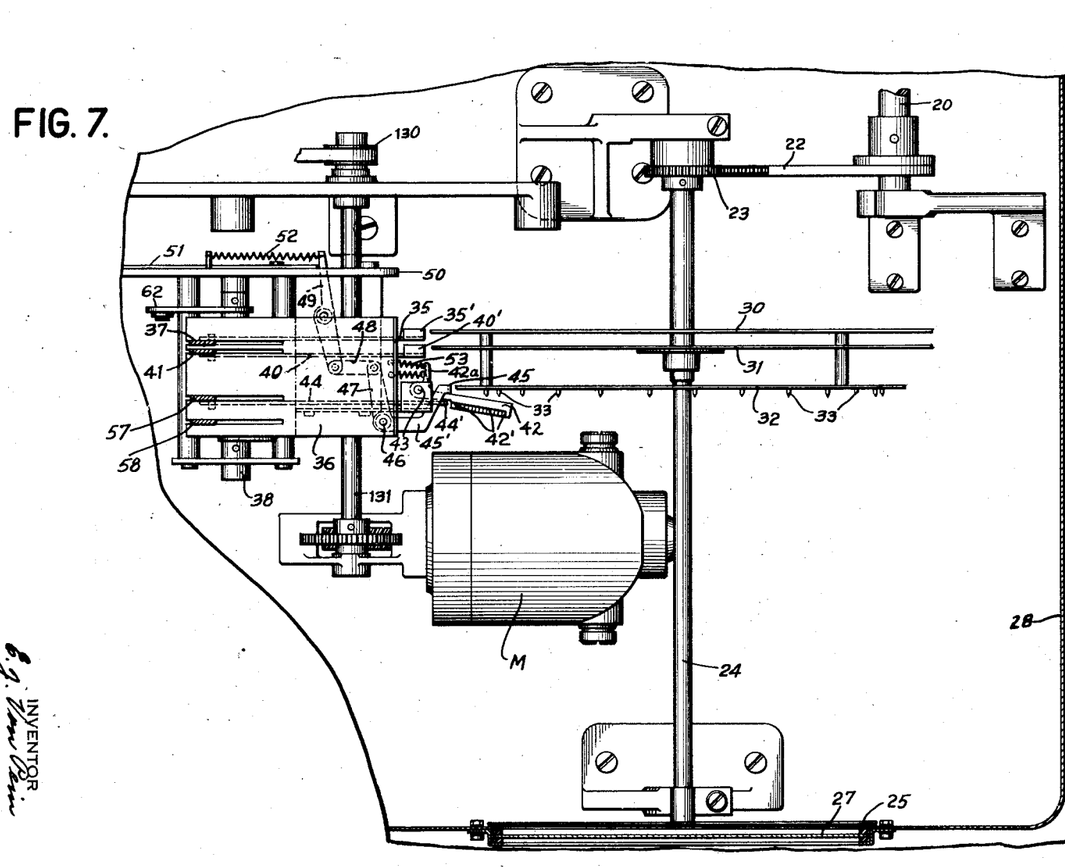
Fig. 7 is a section along lines 7—7 of Fig. 3.

Referring to Figs. 3 and 7, the selector mechanism comprises selector disks 30, 31, and 32 fixed to indicator shaft 24 and to each other for rotation with the shaft to a load point or position corresponding to the weight on platform 10. Disk 30 is the tens of pounds denominational order disk and is formed circumferentially with steps 30—0, 30—1, and 30—2, progressively of small radii, representing 0, 1, and 2 in the tens of pounds order. The maximum capacity being twenty-five lbs., step 30—2 is only half as long as the other steps. With shaft 24 moving from its 0 position up to but not including the 10 lbs. position, step 30—0 travels past an index position coincident with the 0 position of disk 30, during travel of the shaft from the 10 lbs. position up to but not including the twenty lbs. position, step 30—1 traverses the index position; the travel of the shaft from the 20 lbs. position up to but not including the twenty-five lbs. position moves step 30—2 past the index position. The 0 and twenty-five pound points of disk 30 are coincident so that a load of twenty-five lbs. is not to be registered or printed, but loads any fraction less than twenty-five lbs. are to be registered and printed.

Disk 31 is the units of pounds order disk and is formed circumferentially with a series of ten steps 31—0 to 9, progressively of smaller radii, representing 0 to 9 lbs., and occupying the angle subtended by tens order steps 30—0. A similar series of steps 31—0 to 9 lies within the range of tens step 30—1, and a series of five steps 31—0 to 4 occupies the angle subtended by tens step 30—2. The index positions of disks 30 and 31 are horizontally alined, so that for a load range of 0 up to but not including 10 lbs., the first series of steps 31—0 to 9 and step 30—0 simultaneously traverse their index positions; for loads from 10 lbs. up to but not including 20 lbs., the second series of steps 31—0 to 9 and step 30—1 simultaneously traverse the index positions; for loads from 20 lbs. up to but exclusive of 25 lbs., steps 31—0 to 4 of the third series and step 30—2 traverse the index positions.

Disk 32 is the ounce orders disk, provided with a circle of laterally projecting pins 33, successively spaced pound distances apart.

When a load is applied to the scale, shaft 24 is rotated counterclockwise (Fig. 3), positioning disks 30, 31, and 32 relative to their respective index positions according to the load. A step of disk 30 at its index position, a step of disk 31 at its index position, and the distance of a pin 33, nearest to the index position of disk 32 in a counterclockwise direction, from this index position combine to represent the load in pounds and ounces. Thus, for a load of 18 lbs., 12 ounces, disks 30, 31, and 32 have rotated counterclockwise, placing step 30—1 and a step 31—8, within the range of step 30—1, at alined index positions, and positioning a pin 33 at a distance from the ounces index position equivalent to 12 ounces.

Reading mechanism

Reading mechanism is provided to read or sense the load representation of disks 30, 31, and 32 and to read out or transmit such representation to the auxiliary means comprising printing and registering means. The reading mechanism may be said to transfer the load reading of disks 30, 31, and 32 to the printing and registering means.

The tens of lbs. disk 30 is read at its index position by the horizontally bent tab 35' (Fig. 7) formed at the forward end of a slide 35 (also see Fig. 3) mounted in frame 36 for radial slidable movement towards the disk. At its rear end, slide 35 is pivotally connected to an arm 37 rotatably carried by shaft 38 (also see Fig. 5).

The units of lbs. disk 31 is read at its index position by a tab 40' at the forward end of a slide 40 mounted on frame 36 and connected to arm 41 rotatably mounted on shaft 38.

The position of the ounces disk 32 is converted into an ounce reading by primary and secondary reading means. The primary reading means comprises sixteen fingers 42 rockably mounted on a pin 43 carried by frame 36. The sixteen fingers may be referred to as fingers 42—0 to 15, respectively relating to 0 to 15 ounces, and having steps 42' progressively decreasing in radial distance from the axis of disk 32. Thus, the step of finger 42—0 is at a radial distance corresponding to 0 ounce, while the step of finger 42—15 is at a radial distance corresponding to 15 ounces; between these fingers, the steps are evenly graduated to correspond to 1 to 14 ounces. When the load is an exact pound amount without an ounce remainder, a pin 33 of disk 32 is directly in front of zero finger 42—0. For any other ounce position of the disk, a pin 33 will be located in front of the finger corresponding to such ounce remainder. As indicated in Figs. 3 and 7, fingers 42 are superimposed one upon another, with their rear flat faces lying in a common vertical plane, while the front faces of steps 42' also lie in a common vertical plane. Thus, should the fingers be moved towards the side of disk 32, one of them will contact a pin 33 to be held thereby remote from the side of disk 32, in a definitely predetermined position with its step 42' in the path of the head 44' of a slide 44 mounted on frame 36. The remaining fingers will all move equal amounts towards the side of disk 32, and their steps will be out of the path of advance of head 44'. As stated before, fingers 42 comprise the primary ounce reading mans. The head 44' and slide 44 with connected means, to be described later, may be termed the secondary ounce reading means.

Figure 16:
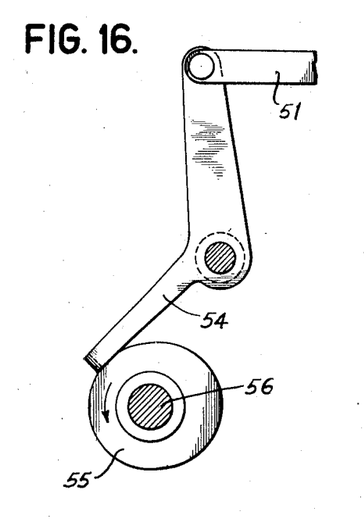

Initially all fingers 42 are held outside the path of rotation of pins 33, as indicated in Fig. 7, by engagement of the flat rear faces of the fingers with the cross bar of a bail 45, the sides or arms 45' of which are pinned to a shaft 46 rotatably mounted in frame 36. At one end, shaft 46 is rigidly provided with an arm 47 connected by link 48 to one end of lever 49, the other end of which projects freely through a slot in frame plate 50 to engage with the forward end of a slide bar 51. The free end of lever 49 is connected to a spring 52 urging the lever counterclockwise (Fig. 7), which through link 48, urges arm 47, its shaft 46, and bail 45 thereof clockwise. Thereby, bail bar 45 is held normally against the backs of fingers 42 to prevent their movement towards the path of rotation of pins 33. When bail rod 45 is moved counter-clockwise to release fingers 42, springs 53, connected to the tails of the fingers, move the fingers towards the side of disk 32, one of them, however, being restrained from such movement by abutting a pin 33. To move bail 45 counter-clockwise, lever 49 must be rocked clockwise and this is done by advance of slide bar 51. As indicated in Fig. 3, slide bar 51 is pivotally connected at its rear end to the upper arm of a lever 54, the lower end of which rests on a cam 55 of cam shaft 56 (see Figs. 4 and 16). Each revolution of cam shaft 56 constitutes one cycle of the machine (see Fig. 22). Near the beginning of the cycle of shaft 56, cam 55 rocks lever 54 clockwise to advance bar 51 against resistance of spring 52 connected to lever 49. This movement of bar 51 is completed at 90° of the cycle. The forward end of bar 51, during its advance, rocks lever 49 clockwise, causing counterclockwise movement of bail 45 to permit movement of fingers 42 towards the side of disk 32. The finger corresponding to the ounce remainder will engage a pin 33 and be restrained thereby from moving its step 42' out of the path of advance of head 44' of slide 44. The remaining fingers will move towards the side of disk 32 as far as permitted by bail 45 and will all be out of the path of head 44' of slide 44. Slide 44 is pivotally connected at its rear end to arm 57 rotatably mounted on shaft 38 (see Figs. 3 and 5).

The hubs of arm 37 of the tens of lbs. slide 35, arm 41 of the units of lbs. slide 40, and arm 57 of slide 44 for reading ounce fingers 42 which have previously read the position of ounce disk 32, are all rotatably mounted on shaft 38. An additional arm 58, the purpose of which will be explained later, is also freely mounted on shaft 38. Springs 59 connected individually to arms 37, 41, 57, and 58 urge the latter clockwise (Fig. 3) to advance their connected slides. This action is normally restrained by engagement of the front edges of the arms with adjustable screws 60 carried by the cross bar of a bail 61, the sides of which are fixed to shaft 38. A crank arm 62 fast to the shaft is connected by link 63 to one end of a lever 64, the opposite end of which follows a cam 65 of cam shaft 56 (see Figs. 4 and 17). Near the beginning of the cycle (Fig. 22), cam 65 permits lever 64 to rock counter-clockwise, causing clockwise rocking of shaft 38, bail 61, and arms 37, 41, 57, and 58, all under the influence of springs 59. The arms 37, 41, and 57, thereupon, advance their respective slides 35, 40, and 44. Slide 35 advances until its feeler end 35' engages a step of tens of lbs. disk 30, corresponding to the tens order lb. value of the load, slide 40 advances until its end 40' engages a step of units of lbs. disk 31 corresponding to the units order lb. value of the load, and slide 44 advances till its head 44' is stopped by the step 42' of the finger 42 corresponding to the ounces remainder of the load. The slides are thus differentially arrested in accordance with the pounds and ounces values of the load, and their connected rocker arms are correspondingly differentially arrested. These differential operations of the slides and their arms are completed at 90° of the cycle (Fig. 22) and control operation of printing and registering means.

*Printing and registering means*

Referring to Figs. 1, 4, 5, 6, and 13, four separate weight totalizers or registers 70, 71, 72, and 73 are provided, each for registering and totalizing the weights of a different class of article. For instance, each register may relate to a different class of laundry work to be charged for at different rates or prices per pound.

Each register comprises seven indicating wheels 75, the lowest order one being the ounce wheel 75-oz. bearing sixteen numbers 0 to 15 around its circumference, the next wheel is the units pound wheel 75—1, the next higher one is the tens pound wheel 75—10, and the remaining wheels are successively in higher orders.

Figures 14, 15:
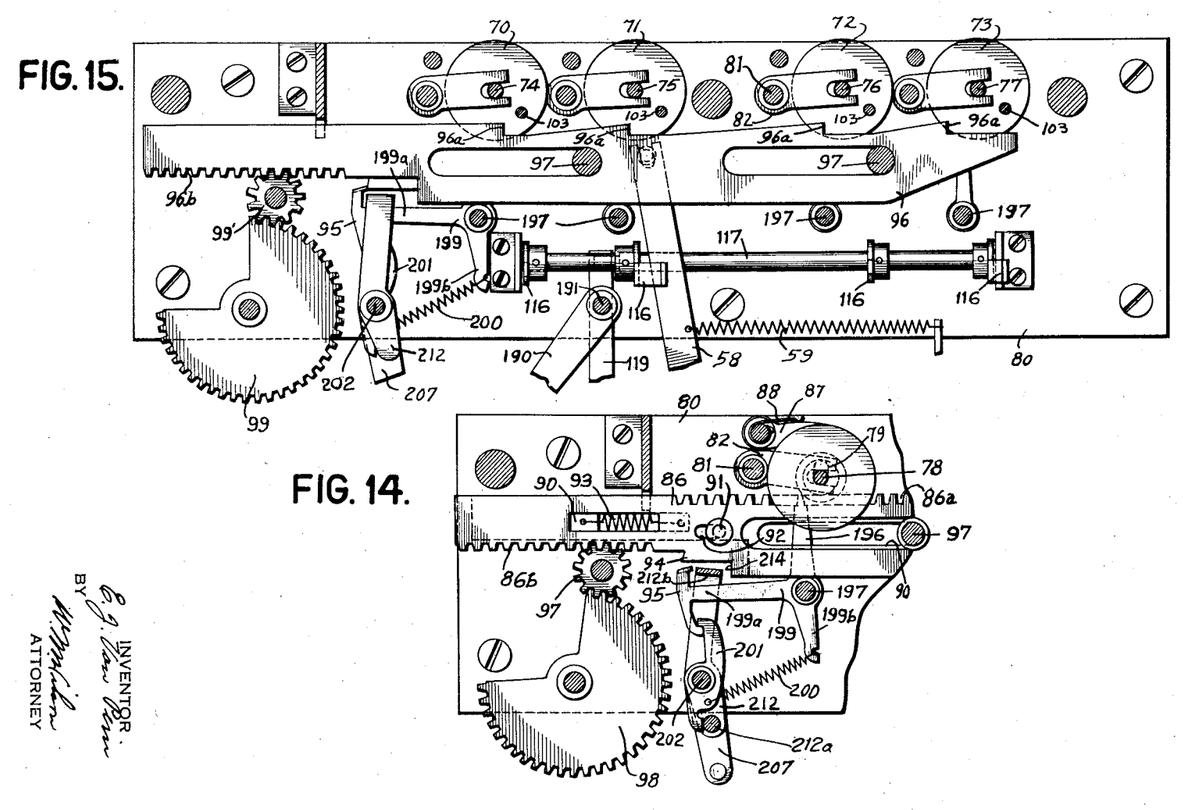
Fig. 14 shows a portion of Fig. 6, with the parts in an actuated position.
Fig. 15 is a section along lines 15—15 of Fig. 4, Figs. 16 to 21 are detail figures showing various cams of the machine.

Each wheel 75 is fixed to a sleeve 76 rigidly provided with a pinion 77. The sleeves 76 are rotatably mounted side by side on a shaft 78 which is capable of vertical movement in vertically elongated slots 79 of frame plates 80 and 80', as indicated in Figs. 3, 6, and 14.

Adjacent each register is a shaft 81 (Figs. 3, 6, 11, 14 and 15) rotatably mounted in frame plates 80 and 80', and rigidly provided with a pair of arms 82 forked at their outer ends to receive the adjacent register shaft 78. One end of each shaft 81 extends outside of frame plate 80' and is rigidly provided with a depending arm 83, the hub of which is formed with a shoulder 83' engageable with the nose end of a latch pawl 84 held down by a spring 85. Normally, each shaft 81 is in counterclockwise position (Fig. 3), retained therein by engagement of pawl 84 with step 83' of arm 83. In this counterclockwise position of a shaft 81, its forked arms 82 hold shaft 78 of the adjacent register in upper position, in which pinions 77 are clear above the upper teeth 86a of associated racks 86.

Figure 6:
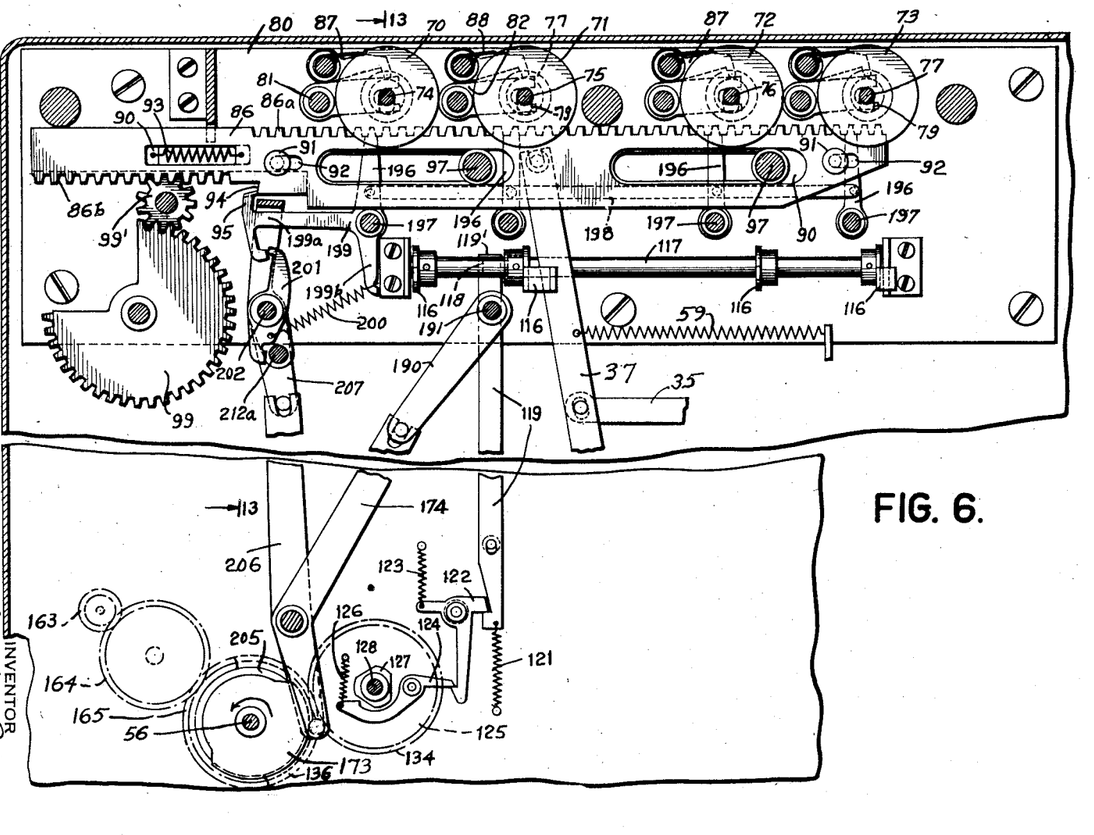
Fig. 6 is a section along lines 6—6 of Fig. 4.

The different orders of a register are impositively held with their readings in alinement by pawls 87 held by wire springs 88 in coaction with pinions 77 of the registers (Fig. 6).

There is one common rack 86 for coacting at spaced longitudinal portions with the four pinions 77 of corresponding orders of the four totalizers 70, 71, 72, and 73. Each rack is held flat against the side of a companion slide 90 by headed studs 91 fixed to the slide and passing through elongated slots 92 of the paired rack. A coil spring 93 between the paired slide and rack tends to move the latter to the left to engage the right ends of slots 92 with studs 91, this movement corresponding in extent to one step of movement of any register order above the ounce order. In the zero position of the slide and rack, shown in Fig. 6, a shoulder 94 of the rack abuts a stop pawl 95 while the slide is one step further to the left, with spring 93 under tension. The paired racks and slides of the ounce, units of lbs., and tens of lbs. register orders and an additional rack slide 96 are mounted for horizontal movement by rods 97 and held in definite transverse location along the rods by bushings 98 (see Fig. 13). The remaining higher order slides 90 are fixed against movement but their paired racks may move along rods 97 for one step of movement to effect a carry-over or transfer from a lower to a higher order wheel, to be explained later.

Racks 86 of the units, tens, and ounce orders of the registers are formed at their left, along their lower edges with teeth 86b, while rack 96 similarly is provided with teeth 96b. Meshed with the lower teeth of each rack is the first gear 99' of a train of gearing 99, the last element of which is a pinion 100 rigid with a type wheel 102. In this manner, each rack is drivingly connected through a separate train of gearing to one of the type wheels 102 mounted in alinement on a shaft 101 (see Figs. 3 and 4).

Figure 11:
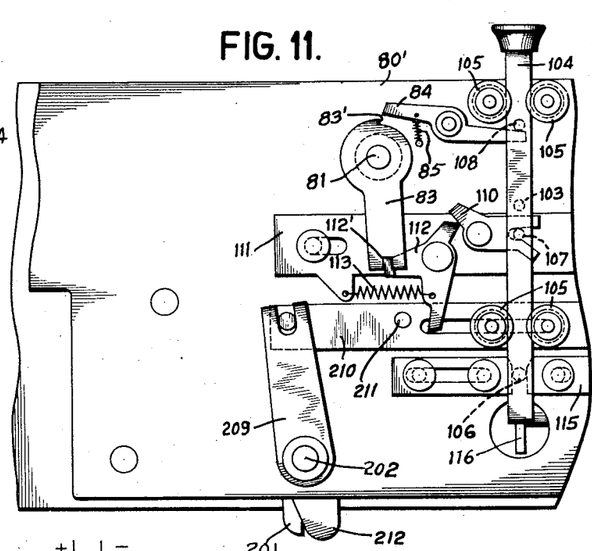
Fig. 11 is an enlargement of a portion of Fig. 3 showing a different position of the parts.

Rack 96 is formed along its upper edge with four steps 96a (Fig. 15) differentially distant from pins 103 (also see Figs. 4 and 11) secured to and extending from the sides of keys 104 (see also Figs. 1 and 3). There is one key 104 for each totalizer, and each key is vertically guided by guide rollers 105 and provided with a lowermost pin 106, a next higher pin 107, the still higher pin 103, and an upper pin 108, all indicated in Fig. 11. Normally, a key 104 is in raised position and its pin 103 is above the top of slide 96. Upon depression of a key, its pin 103 moves down in front of an associated step 96a of rack 96, prepared to engage this step to arrest the slide after a differential movement corresponding to the classification of the key. The pin 107 of a key is seated in the forked end of a latch 110 pivoted to a slide 111. Latch 110 initially engages the tail of a coupling dog 112, also pivoted on slide 111, and prevents clockwise movement of the dog, as indicated in Fig. 3. When a key 104 is depressed, its pin 107 rocks latch 110 clockwise to release it from dog 112, as indicated in Fig. 11, permitting a spring 113 to rock the dog clockwise to seat a lug 112' thereof within a notch in the lower end of arm 83 of the shaft 81 adjacent the register associated with the depressed key. Arm 83 and its shaft 81 are thus coupled by dog 112 to slide 111. When latch 110 is released from dog 112 and the latter rocked clockwise, the bottom of the latch abuts the top of the tail of dog 112, preventing counterclockwise rocking of the latch and return rise of the key.

After lug 112′ of a dog 112 enters the notch of arm 83, pin 108 of the key effects release of latch 84 from shoulder 83′ of arm 83. With latch 84 released from arm 83, the latter, its shaft 81, and the associated register are now held in initial position only by lug 112′ of dog 112.

The lowest pin 106 of a key 104 is located normally between the oppositely beveled edges of flanking horizontal key stop slides 115. When a key is depressed, its pin 106 spreads the flanking slides apart to seat between the facing vertical edges of the slides. The remaining slides crowd together to prevent depression of any other key 104, so that only one key at a time may be depressed.

*Drive means and one-revolution cycle.*—The lower edge of each key 104 is directly on top of one of four parallel, horizontal arms 116 (Figs. 3, 4, 5, 6, and 15) pinned to a shaft 117. The second arm 116 from the left (as viewed in Fig. 6) is extended to the rear to provide a rearward extension 116′ from which a pin 118 (Figs. 4, 5, and 6) projects laterally, underneath the bent over upper end 119′ of a vertical slide 119 (also see Fig. 8). When a key 104 is depressed, it moves the underlying arm 116 downwardly, causing shaft 117 and extension 116′ to rock clockwise (Fig. 4) against resistance of a spring 120. Pin 118 thereupon raises slide 119 against resistance of a spring 121 connected to the lower end of the slide. The lower end of slide 119 is formed as a hook latching a pawl 122 to prevent a spring 123 from rocking the pawl clockwise (Fig. 6).

It may be noted that springs 123, 121, and 120 combine to resist depression of any of keys 104 and normally hold the keys in upper position.

Pawl 122 latches a clutch dog 124 pivoted to the driven clutch disk 125 and prevents a spring 126 from rocking the dog into coupling engagement with a clutch cam 127 fixed to shaft 128. One end of shaft 128 has a pulley 129 driven by a belt from a pulley 130 (Fig. 7) on a shaft 131. Shaft 131 is geared to the shaft of driving motor M (also see Figs. 3 and 4). Thus, while motor M is running, driving clutch shaft 128 is continuously rotating. The motor M is placed in operation when the switch 221 (Fig. 1) is set in "on" position. This switch is diagrammatically shown in the circuit diagram, Fig. 12. When a key 104 is depressed to rock associated arm 116 and its shaft 117 for raising slide 119, the latter rocks pawl 122 counterclockwise (Fig. 6). Pawl 122 thereupon releases clutch dog 124 which moves into engagement with clutch cam 127, thus coupling driving shaft 128 to driven clutch disk 125.

Figures 17, 20, 21, 22:
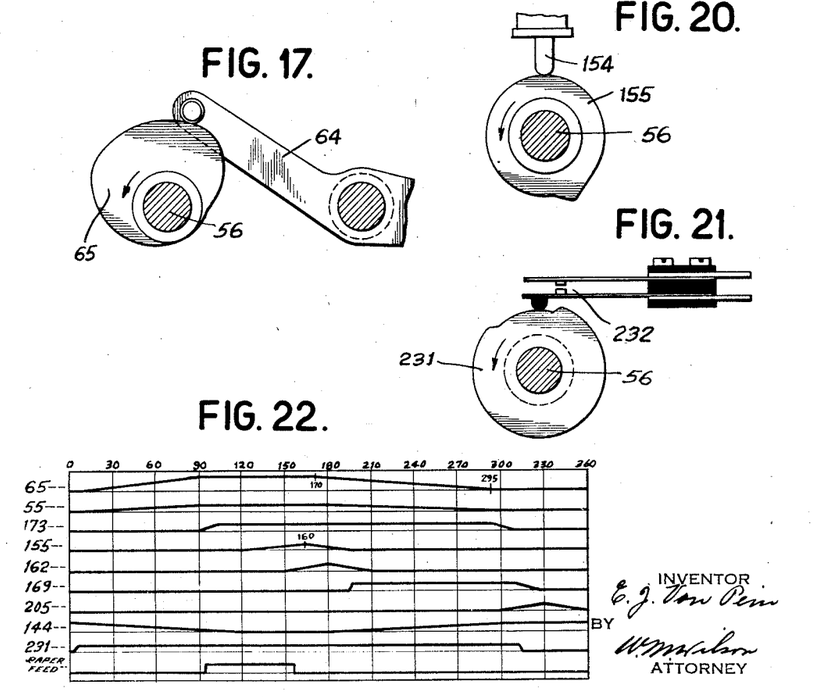
Figure 18:
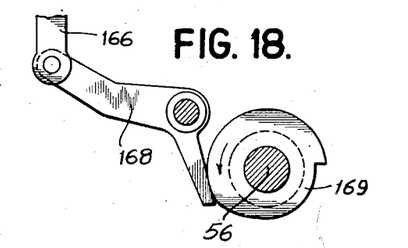

Clutch disk 125 is fast to one end of a sleeve 133 (Figs. 8 and 9) freely surrounding shaft 128 and rigid with a pair of gears 134 and 135. Gear 134 meshes with gear 136 (see also Figs. 4 and 6) of cam shaft 56 to rotate the latter for a one revolution cycle (Fig. 22).

*Reading operation.*—As explained before, near the beginning of the cycle of cam shaft 56, cam 55 (Figs. 4, 16, and 22) coacts with lever 54 (Fig. 3) to move slide bar 51 towards the right. Bar 51 acts through lever 49, link 48, and arm 47 to rock shaft 46 and bail 45 counterclockwise (Fig. 7), enabling fingers 42 to move towards the side of ounce disk 32. In accordance with the ounce remainder of the load, a pin 33 of disk 32 will be behind one of the fingers, corresponding to such ounce remainder, so as to abut the latter finger and prevent it from moving towards the side of disk 32, thereby placing the step 42′ thereof in the path of advance of head 44′ of slide 44.

While the above action is taking place, cam 65 (Figs. 4, 17, and 22) permits lever 64 to rock counterclockwise (Fig. 3), enabling clockwise movement of bail 61 to be effected by arms 37, 41, 57, and 58 under the influence of springs 59, as explained before.

*Key classification printing selection.*—Arm 58 is pivotally connected at its upper end to slide 96 (see Fig. 15), and when the arm moves clockwise under the pull of its spring 59, it actuates this slide to the right until a step 96a thereof abuts the lowered pin 103 of the depressed key 104. The steps 96a are differentially spaced from the pins 103 of the different keys to permit differential movement of slide 96 varying in accordance with which key is depressed. Differential movement of this slide acts through its rack teeth 96b, and gearing 99, 100 to differentially rotate the right hand type wheel 102 (as viewed in Fig. 4), placing a type character thereof, corresponding to the code or classification of the depressed key, in printing position.

*Weight printing selection.*—Arms 37, 41, and 57 are pivotally connected, respectively, to the slides 90 of the tens, units, and ounces orders of the registers or totalizers 70, 71, 72, and 73. When arm 37 moves clockwise, it simultaneously moves its connected slide 90 and the feeler slide 35 to the right. When the feeler end 35′ of slide 35 reaches the locus of a "0" step of tens order disk 30, the studs 91 of the slide 90 have taken up the play in slots 92 of companion rack 86, and further movement of slide 90 to the right thereafter will effect joint movement of the paired rack. For a "0" value in the tens order, rack 86 will have no movement at all. For tens order values 1 to 9, feeler slide 35 will move one to nine steps, causing associated slide 90 to move the companion rack 86 correspondingly.

Similarly, arm 41 will be arrested when its connected feeler slide 40 engages its end 40′ with a step of units order disk 31, causing associated slide 90 to move its paired rack 86 differentially in accordance with the value of the units order of the load.

Likewise, arm 57 will be arrested when its connected feeler slide 44 engages its head 44′ with the step 42′ of the finger 42 which is being held back by a pin 33 of ounce disk 32. Accordingly, associated slide 90 will effect a differential movement of companion rack 86 corresponding to the value in ounces of the remainder of the load.

Differential movements of rack 86 will be transmitted through their lower rack teeth 86b and gearing 99 and 100 to type wheels 102. The left hand type wheel 102 (Fig. 4) will be positioned to print the tens order value of the load, the next wheel 102 to print the units order value of the load, and the third wheel from the left to print the ounces remainder. Each of the type wheels, except the ounce wheel, has ten types 0 to 9. The ounce wheel has sixteen types 0 to 15 for printing 0 to 15 ounces, and the gearing 99, 100, and rack teeth 86a associated with the ounce wheel are designed to move the ounce wheel one to fifteen differential steps, corresponding to 1 to 15 ounces, as determined by the steps 42' of the ounces sensing fingers 42.

*Serial numbering.*—Alined with type wheels 102 are serial numbering type wheels 140 (Fig. 4) for printing serial numbers. These type wheels are advanced one unit each revolution of cam shaft 56 by means of a multiple pawl 141 when the latter is rocked during each revolution of the cam shaft. The pawl is rocked by engagement of a pin 142 connected thereto with a rocker arm 143 following a cam 144 (see Figs. 4 and 22). The serial number means are of ordinary construction and need not be described further.

*Printing operation.*—Below type wheels 102 and 140 is passed an ink ribbon 145 (see Fig. 3), carried by spools 146, and the feed means of which need not be described herein.

Before the printing operation takes place, feed rolls 147 (Figs. 3 and 8), in a manner which will be explained later, have fed paper P, to be printed on, from a supply roll (not shown) across the flat table 148 and through and past upper and lower eject rolls 149, normally spaced apart.

Figure 4:
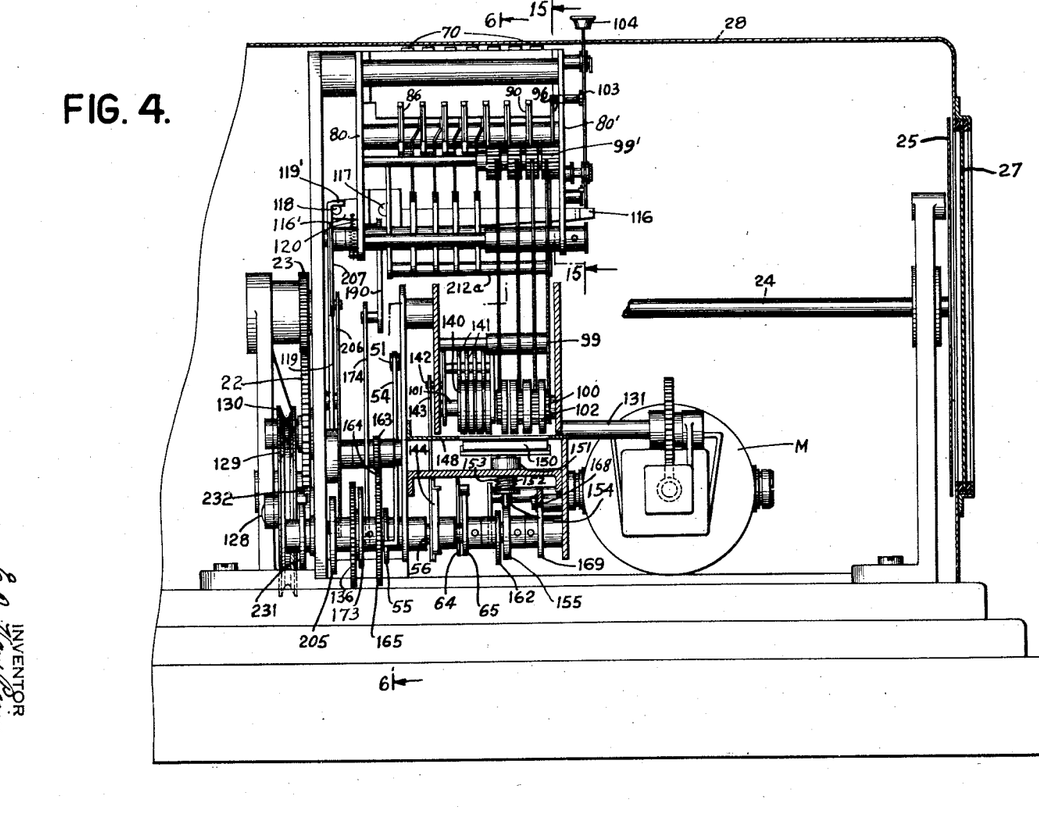
Figs. 4 and 5 are sections, respectively, along lines 4—4 and 5—5 of Fig. 3.

Table 148 is cut out below the type wheels to enable a printing hammer 150 to move upwardly therethrough (see Fig. 4). Hammer 150 is guided for vertically slidable movement by bushings 151 surrounding posts 152 depending from the hammer. Springs 153, surrounding posts 152, normally depress the hammer. Centrally depending from hammer 150 is a pin 154 following a cam 155 of cam shaft 56 (see Figs. 4 and 20). After the type wheels have been positioned according to the key classification, the load, and the serial number, and after a strip of paper P has been fed into printing position, between platen or hammer 150 and the type wheels, the cam 155 at about 160° (see Fig. 22) moves hammer 150 upwardly, against resistance of springs 153, to cause the type wheels to print the key code, the weight in pounds and ounces, and the serial number along a single line on the strip of paper P.

Figures 8, 10:
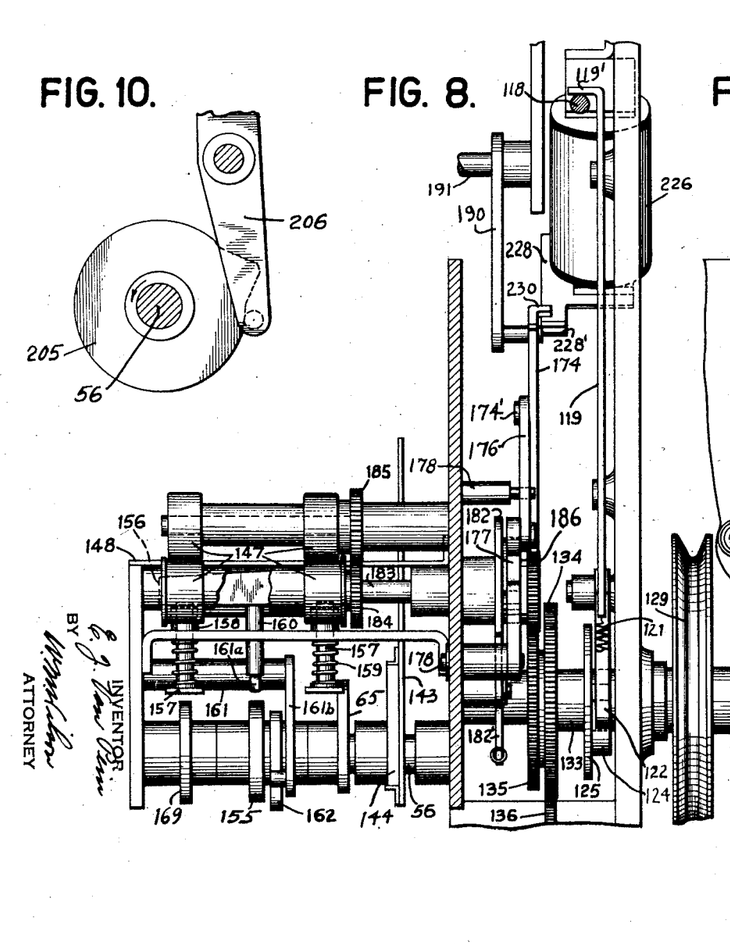
Fig. 8 is a section substantially along lines 8—8 of Fig. 3.
Fig. 10 shows one of the cams and lever controlled thereby.
Figure 19:
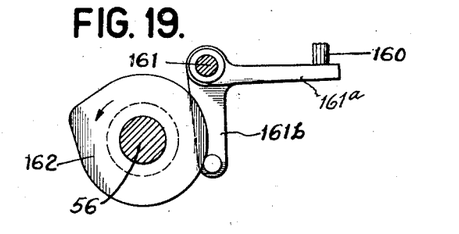

*Paper shearing.*—After the printing operation, the printed strip is severed and ejected. The strip shearing means comprises cutting blade 156 (Figs. 3 and 8) rigid with dependent pins 157 slidably guided in fixed bushings 158 and held down by springs 159. A central, depending pin 160 of the cutter abuts an arm 161a fast to a sleeve shaft 161 which has a rigid arm 161b following a cam 162 (Figs. 4, 8, and 19). After the printing operation (see Fig. 22), cam 162 rocks arm 161b, shaft 161, and arm 161a counterclockwise (Fig. 3), elevating blade 156 to sever the printed ticket from the web of paper P, which is then ejected, as will be explained now.

*Ticket eject.*—The forward, free end of the strip or ticket, when in printing position, is between and slightly past the upper and lower eject rolls 149, which are initially spaced apart. The shaft of the lower eject rigidly carries a pinion 163 (Figs. 4 and 6), meshed with gear 164, driven by gear 165 fast to cam shaft 56. The shaft of the upper eject rolls 149 is supported by the corner of a rockable L-shaped frame 166, pivoted on a stud 167 and connected at its lower end to a lever 168 (Fig. 3) following a cam 169 (Figs. 4, 8, 18, and 22) of cam shaft 56. A spring 170, connected to lever 168, urges the latter against the cam. After the printed ticket has been severed by blade 156, cam 169 permits lever 168 to move counterclockwise, in turn rocking lever 166 clockwise, thereby moving upper eject rolls 149 down into coaction with the lower eject rolls to eject the severed strip or ticket. The upper and lower eject shafts are geared together (not shown) in the usual way, so that when the upper eject shaft is moved down, positive rotation of the upper and lower eject rolls will take place to eject the printed and severed strip to the exterior of housing 28.

*Paper feed.*—Prior to the printing operation, a blank strip or ticket portion of paper P is fed into printing position by feed rolls 147 (Figs. 3 and 8). The feeding means includes a control cam 173 (Figs. 4, 6, and 9) on shaft 56, which engages the lower end of a lever 174 urged counterclockwise (Fig. 9) by a spring 175. Lever 174 has a stud 174' seated in the square-notched right end of a link 176 which at the opposite end is connected to a latch lever 177. In the initial position of link 176, a notch 176' thereof is receiving a fixed pin 178. A spring 179 connected to link 176 urges the link to the right and downwardly, holding notch 176' against pin 178 and also maintaining the notched end of the link in engagement with stud 174' of lever 174. The right side of notch 176' is inclined and leads to an inwardly cut edge 176a of the link. Latch lever 177 normally latches a clutch dog 180 against engagement with a driving clutch cam 181. The clutch dog 180 is carried by a driven clutch disk 182 held in home position by a rebound pawl 182'. Disk 182 is fast to shaft 183 of lower feed rolls 147 (see Fig. 8). Lower feed roll shaft 183 drives the upper feed roll shaft through gears 184 and 185. The driving clutch cam 181 is rigid with a gear 186 rotated by previously-mentioned gear 135 of the driven one-revolution clutch sleeve 133. At 90° of the cycle (see Fig. 22), cam 173 permits lever 174 to rock counterclockwise (Fig. 9), causing stud 174' to shift link 176 to the left, thereby rocking latch lever 177 counterclockwise to release clutch dog 180 for engagement with driving clutch cam 181. The driven disk 182 is thus coupled to cam 181 for causing rotation of lower feed roll shaft 183 by gear 186. Through gears 184 and 185, the lower feed roll shaft also drives the upper feed roll shaft, so that upper and lower feed rolls 147 are now rotating to feed the ticket strip into printing position.

As link 176 was moved to the left (Fig. 9) and as it released latch 177 from clutch dog 180, the inclined side of notch 176' of the link was cammed upwardly by fixed pin 178 and the inwardly cut edge 176a of the link rode onto the fixed pin, thereby raising the right hand, notched end of the link above the center of stud 174' of lever 174. The continued movement of stud 174' cams the link 176 upwardly so that its lower edge clears the stud, permitting spring 179 to return link 176 immediately to the right, and thereby causing the latch 177 to return to position for intercepting clutch dog 180 to interrupt rotation of the driven lower feed roll shaft at the end of one revolution, regardless of the time of return of lever 174. Thus, as indicated in Fig. 22, cam 173 starts to rock lever 174 at 90° of the cycle of main cam shaft 56, causing a feed cycle to start at 95° and stop at 157°. The lever 174, however, remains in actuated position, under control of cam 173 till about 295°.

During the feed cycle, the ticket strip of paper P has been fed into printing position, and is located there at 157° of the main cycle. The printing operation under control of cam 155 takes place thereafter, at about 160° of the cycle.

Figure 5:
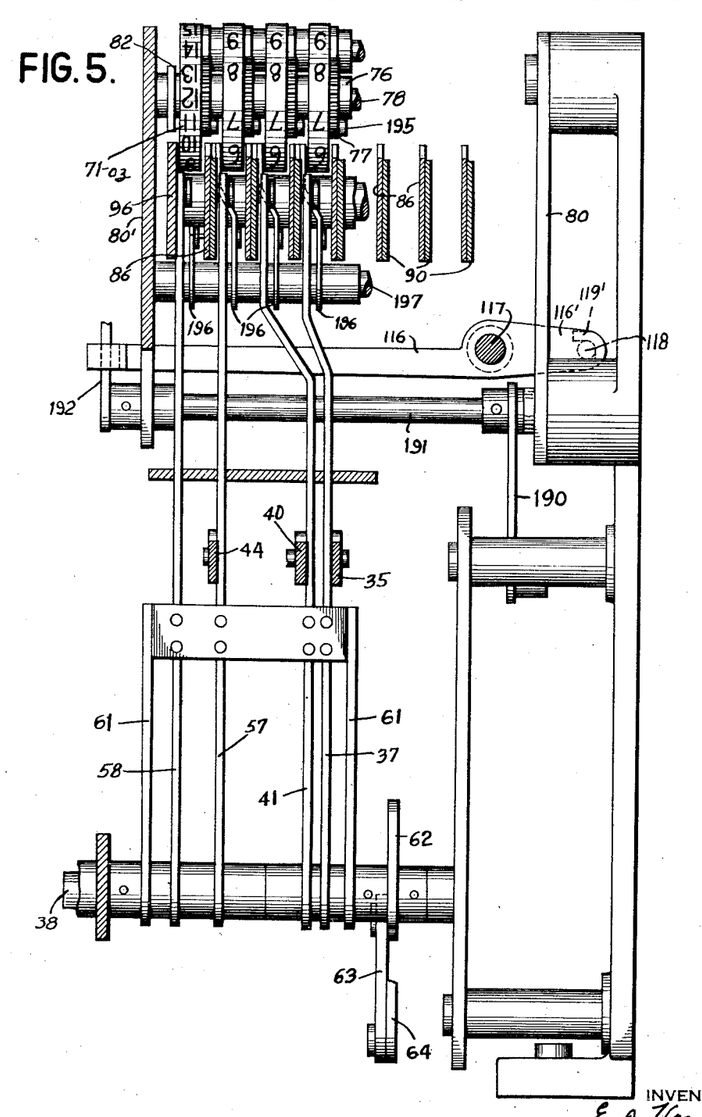

*Weight registering operation.*—When lever 174 is rocked counterclockwise (Fig. 9) to initiate a paper feed cycle, it also causes the selected register 70, 71, 72, or 73 to be coupled to racks 86 for operation during return movement of the racks to their zero positions. For this purpose, the upper end of lever 174 has a pin and slot connection to the lower end of an arm 190 fast to one end of a shaft 191, rigidly provided at the other end with an upright arm 192 (Figs. 3 and 5). The upper end of arm 192 has a pin and slot connection with slide 111. When lever 174 is rocked counterclockwise (Fig. 9), its direction of movement is clockwise in Figs. 3 and 6. This results in counterclockwise movement of upright arm 192, effecting movement of slide 111 to the left, causing the dog 112 thereon which previously was coupled to an arm 83 by depression of a key 104, to also move to the left (also see Fig. 11). Dog 112 thereupon rocks arm 83, its shaft 81, and arms 82 thereof clockwise (Figs. 6 and 15), lowering the associated, selected register, to mesh pinions 77 of the latter with upper teeth 86a of racks 86, as indicated in Fig. 14. All this occurred at about 100° (see Fig. 22) after the racks were moved under control of cam 65 in accordance with the sensing of the stepped disks to position the type wheels 102 for printing the load. At about 170° after printing has occurred at about 160°, cam 65 starts restoring racks 86. Cam 65 acts through lever 64, link 63, arm 62, and shaft 38 to restore bail 61 counterclockwise (Fig. 3). During restoration of bail 61, it encounters arms 37, 41, 57, and 58, now in differential positions corresponding to the load and key code character, and returns these arms to their home positions. The return of the arms effects return movement of the tens, units, and ounce slides 90 and of rack slide 96. Return of the latter slide restores the associated key code type wheel 102 to home position.

It will be recalled that during the forward movement of each slide 90 under control of the connected weight sensing means, the paired rack 86 moved one step less than the slide as the play in slots 92 of the rack was taken up by studs 91 under the influence of spring 93 as the latter relaxed. The resulting advance of rack 86 was equivalent to the differential value of the load order sensed by the associated reading means, and caused positioning of a type wheel 102 according to such value. During return of a slide 90, the slide, acting through spring 93, returns the paired rack. As the rack returns, its upper teeth 86a now meshed with the lowered pinion 77 of an order of the register selected by the depression of a key 104, rotate the register order to enter a value therein. When the slide has reached its home position and rack 86 has been arrested in zero position by engagement of its shoulder 94 with stop pawl 95, the rack has been moved back the extent of its previous differential advance, which corresponded to the load value in one order. This is so regardless of whether the resistance of rotation of the register order to the return of the meshed slide or whether any other resistance to the return of the meshed slide effects stretching of spring 93 to permit return movement of the slide relative to the rack until the studs 91 of the slide engage the left ends of slots 92 of the rack. In any event, whether the spring 93 has stretched before pawl 95 stops the rack or stretches while slide 90 continues its return after the rack has been stopped, the return movement of the rack is equal to its previous forward movement, which corresponded to the load value. Thus, the return movement of each rack 86 enters one order of the load value into the meshed register order. Each of the orders of the register wheels 75 except the ounce wheel 75-oz. is graduated to indicate 0 to 9. The ounce wheel is graduated to read 0 to 15, as indicated in Figs. 5 and 10. Accordingly, just as the ounce printing wheel was geared to the teeth 86b of the ounce rack 86 to move 1 to 15 steps, so the upper teeth 86a of the ounce rack 86 are smaller than the teeth 86a of the other racks 86. Also, the pinion 77 of the ounce wheel 75 has sixteen teeth to mesh with teeth 86a of the ounce rack, so as to be rotated thereby in multiples of one-sixteenth of a revolution, each one-sixteenth step corresponding to one ounce. On the other hand, the pinions 77 of the higher order wheels 75 have ten teeth to be moved in multiples of one-tenth.

*Carry-over or register transfer.*—When the ounce order wheel 75-oz. of a register moves from "15" to "0", a transfer of "1", corresponding to one pound, must be effected to the units wheel 75—1. Also, upon movement of units pounds wheel 75—1 from "9" to "0", transfer of "1" must be effected to the tens of lbs. wheel 75—10, and so on, from each order wheel to the higher order wheel. For this purpose, each pinion 77 has a transfer stud 195 extending transversely from the side of a pinion tooth. When a register is selected for operation, its pinions 77 are lowered into mesh with teeth 86' of racks 86, and each of the transfer studs 195 is thereby located in a path of rotation which intercepts the upper end of an upright arm 196. There is one such arm for each pinion of each register order except the highest order. Also, one such set of arms 196 is provided for each of the registers 70, 71, 72, and 73 (see Figs. 5, 6, 13, and 14). The arms 196 of each register set are rotatably carried by a rod 197. The four arms of corresponding orders of the several totalizers are connected for common rocking movement by a link 198 (Fig. 6). The left hand arm 196 (Fig. 6) is part of a three-armed lever 199 which has a horizontal arm 199a, the outer end of which is formed as the previously-mentioned rack stop 95. A depending arm 199b of lever 169 is connected by a spring 200 to the lower arm of a lever 201 rotatably carried by a shaft 202. In the zero position of a rack 86 (Fig. 6), the outer edge of the upper, hook-shaped end of lever 201 abuts the lower, complementarily hooked end of the rack stop 95.

Figure 13:
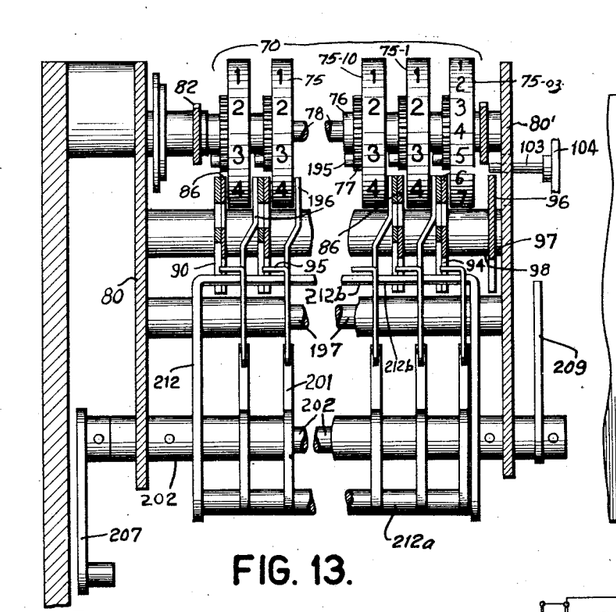
Fig. 13 is a section along lines 13—13 of Fig. 6.

As best shown in Fig. 13, the upper end of each arm 196, in the path of rotation of transfer lug 195 of a register order, is connected to the stop pawl 95 which is in the path of shoulder 94 of the rack 86 of the next higher register order.

When any register is in lower, entry-receiving position, and the ounce order wheel 75-oz. thereof advances from ("15" to "0", the transfer lug 195 thereof engages and rides past the upper end of the associated arm 196 to rock the latter counterclockwise (Fig. 6). Similar action is effected when any other order of the register advances from "9" to "0". Regardless of which denominational order arm 196 has been rocked, its movement is transmitted, through link 198, to the connected lever 199, rocking the latter counterclockwise against resistance of spring 200, and thereby, lowering the upper end of rack stop pawl 95 below shoulder 94 of the rack of the register order next higher than the one which, by advancing one step to its "0" position, has effected actuation of the arm 196. As the stop pawl is rocked downwardly, its lower end moves below the upper hook end of lever 201 and is thereby latched in lowered position, as indicated in Fig. 14. Thus, when the rack 86 in front of the upper, horizontally bent stop end of the lowered and latched pawl 95 reaches "0" position, instead of being stopped by the pawl, it moves with its paired slide 90 further to the left until the slide reaches home position. At this point, the right hand ends of slots 92 of the rack abut the studs 91 of its paired slide, so that rack 86 has moved an additional step corresponding to one step of entry movement of the meshed register order, thereby transferring "1" thereto from the next lower order wheel which has moved from "9" to "0", or in the case of the ounce wheel, from "15" to "0". For those register orders above the tens of lbs. orders, the release of pawls 95 from shoulders 94 permits immediate transfer operation of the racks.

The weight registering operation is completed at about 295° under control of cam 65 (Fig. 22). The next operation is the return to the right of the slide 111 to its home position. This is effected as cam 173 starts at 295° to return lever 174 clockwise, as viewed in Fig. 9 or counterclockwise, as viewed in Fig. 3. Return of lever 174 effects rocking of arm 190, its shaft 191, and arm 192 thereof, clockwise as viewed in Fig. 3. Arm 192 moves slide 111 to the right (also see Fig. 11), causing the dog 112 thereof still coupled to the arm 83 to restore the latter counterclockwise, effecting return upward movement of the selected register to the inactive position, with its pinion 77 clear above and demeshed from racks 86 (see Fig. 6).

The next operation is effected by a cam 205 (Figs. 4 and 10) of cam shaft 56, which, at 330° (Fig. 22) rocks a lever 206 counterclockwise to effect clockwise movement of a pivotally connected arm 207 (also see Figs. 3, 13, 14, and 15) fixed to shaft 202. Arm 209 of shaft 202 has a pin and slot connection with a slide 210 (Figs. 3 and 11) having four studs 211, each in front of the lower arm of one coupling dog 112 of slide 111. Clockwise movement of arm 209 shifts slide 210 to the right, causing the pin 211 in front of the dog 112 which is coupled to an arm 83 (the left hand one in Fig. 11) to strike said dog and rock it counterclockwise, releasing lug 112' from arm 83, which has already been returned to its normal counterclockwise position by return of slide 111, as previously described. Arm 83, its shaft 81, arms 82 thereof, and the register connected therewith, are now, at 330° of the cycle, uncoupled from slide 111 and the register is in normal upper position.

When dog 112 is rocked counterclockwise (Fig. 11) by a pin 211 of slide 210, its upper end rides off the bottom of the left arm of latch 110, permitting key 104 to rise. As the key rises, its pin 107 rocks latch 110 counterclockwise to place its left end behind the tail of dog 112, thereby latching the latter in normal position, as indicated in Fig. 3. When dog 112 released latch 110, the key was permitted to rise, as above described. The rise of the key is effected mainly by spring 121 (Fig. 6), acting to depress slide bar 119, the upper end 119' of which acts on pin 118 of arm 116' to rock shaft 117 counterclockwise (Fig. 4), causing the arm 116 underneath the key 104 to rise and elevate the key. Thus, when the key is permitted to rise by the release of dog 112 from the bottom of latch 110 (Fig. 11), slide 119 (Fig. 6) also is released for depression by spring 121. As slide 119 moves down, it pemits pawl 122 to rock clockwise (Fig. 6), placing its lower, hook end in the path of rotation of the tail of clutch dog 124. The engagement of the pawl 122 with the tail of dog 124 uncouples the latter from clutch cam 127, thus stopping driven clutch 125 at the end of a one-revolution cycle. Since cam shaft 56 is geared 1:1 to clutch disk 125, the cam shaft also is arrested at the end of one revolution.

Cam 205 (Figs. 4 10, and 22) as described above, effected actuation of arm 206 to rock arm 207, its shaft 202, and arm 209 thereof clockwise (Figs. 3 and 11) for causing movement of slide 210 to cause return of the register and its key 104 to normal positions. When shaft 202 is rocked clockwise, it rocks a bail 212 (also see Fig. 13) pinned thereto in the same direction. Bail 212 has a cross rod 212a at its lower end and a cross bar 212b at its upper end. Clockwise rocking of bail 212 causes the rod 212a to act on the lower ends of levers 201 to unlatch the upper hook ends of the levers 201 from any of the transfer pawls 95 which may have been latched down by a carryover operation (see Fig. 14). At the same time, cross bar 212b engages the shoulders 214 of those racks 86 which have been released for an additional transfer step and moves these racks to the right into their "0" positions, in which they are then retained by the transfer pawls 95.

Incidentally, when cam 65 caused return of racks 86 and 96, to effect the registration in the selected register of the load, the weight and key code printing wheels 102 are restored to zero positions. Thus, as racks 86 and 96 return to zero positions, their lower teeth 86b and 96b acted through gearing 99', 99, and 100 to restore the type wheels 102 to zero positions.

Figure 12:
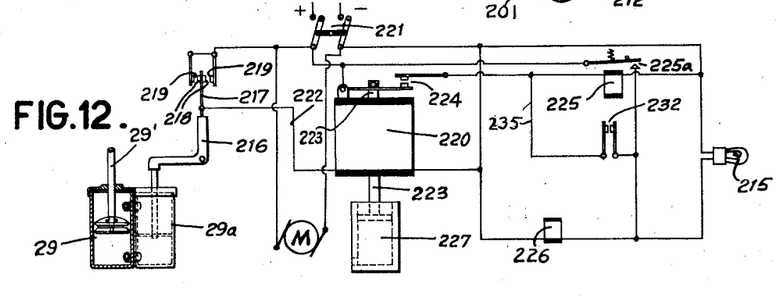
Fig. 12 is the circuit diagram.

*Equilibrium control.*—The initiation of a cycle of operations was effected by depression of any one of keys 104. It is desirable not to depress any key 104 until the scale has come to rest or is in equilibrium under the load. To indicate to the operator when the key 104 should be depressed, a signal light 215 (Figs. 1 and 12) lights up while the weighing mechanism is moving and darkens when the scale comes to rest under a load. For this purpose, dash pot 29, connected through plunger 29' to base lever 13 is utilized. As disclosed in Patent No. 2,027,077, the main dash pot 29 communicates with an auxiliary dash pot 29a, the plunger of which operates a bell crank lever 216. Referring to Fig. 12, the vertical arm of the bell crank lever has a conductive spring strip 217 provided with opposite contact studs 218, alternately engageable with a pair of contacts 219 straddling the contacts 218.

When a load is applied to platform 10 (Figs. 1 and 2), lever 13 is depressed, causing a surge of oil in dash pot 29, which is transmitted to the oil in dash pot 29a, causing oscillation of lever 216 until the scale comes to rest. Oscillation of lever 217 rapidly, but alternately, engages the opposite contacts 218 with contacts 219. Each such engagement closes a circuit through a solenoid 220, as follows: from the positive side of the supply line through switch 221, through either contact 219, the engaged contact 218, strip 217, a line 222, solenoid 220, and to the negative side of the line.

Energization of solenoid 220 raises its plunger 223, causing closure of contacts 224 to form a circuit from the positive side of the line through contacts 224, a relay coil 225, to the negative side of the line.

Energization of relay 225 closes relay contacts 225a to form a circuit from the positive side of the line, through contacts 225a, and signal lamp 215, to the negative side of the line.

Signal lamp 215 lights up, signaling the operator not to depress any of keys 104. When the scale comes to rest, dash pot contacts 218 are free of either contact 219, breaking the circuit of solenoid 220, permitting coil 223 to drop, opposed by the damping action of air dash pot 227, until contacts 224 open. Opening of contacts 224 breaks the circuit of relay 225, contacts 225a open, and lamp 215 is extinguished, signaling to the operator that a key 104 may be depressed to start a cycle of weight printing and totalizing operations.

When relay contacts 225a close, as above described, then in addition to a circuit being formed through signal lamp 215, a shunt circuit is formed through a magnet 226 as follows: from the positive side of the line, through relay contacts 225a, magnet 226, and to the negative side of the line.

Figure 9:
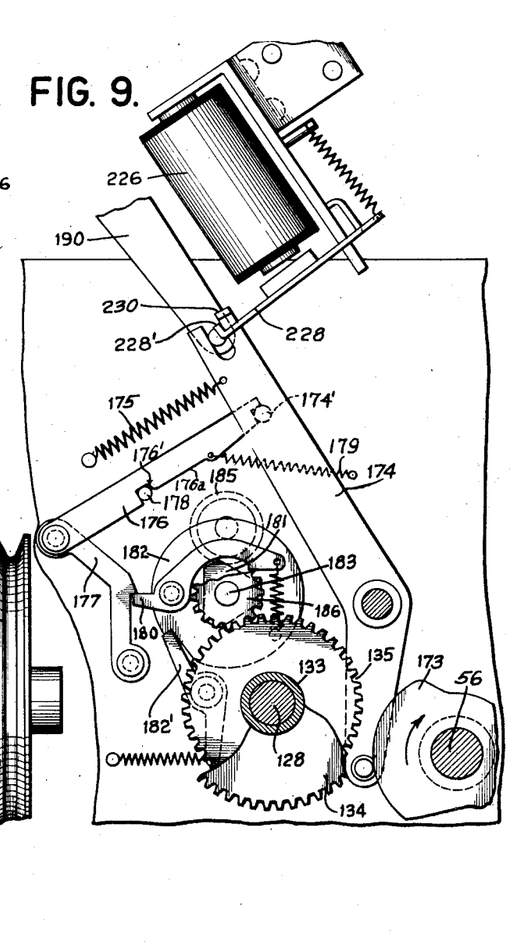
Fig. 9 is a view looking at the right side of Fig. 8.

Referring to Figs. 8 and 9, energization of magnet 226 rocks its armature 228 upwardly to place the upwardly turned hook end 228' of the armature in front of a horizontally bent tab 230 at the upper end of lever 174. The lever 174 is thus latched against counterclockwise movement (Fig. 9) under control of its cam 173. As indicated in Fig. 22, cam 173 normally permits rocking of lever 174 at 90° of the cycle. Thus, disturbance of the equilibrium after 90°, energizing magnet 228 to rock its armature 226 is unavailing to stop operation of lever 174 since the latter has by then departed from its normal position in which it may be caught by hook 228' of armature 228. But, at 90°, the reading of the stepped weight disks has already been completed under control of cams 55 and 65, and since this reading was effected while the scale was at rest, the remaining operations of the cycle will correctly print and register the actual load on the scale. Thus, lever 174 will properly cause release of the feed clutch dog 180 to initiate a feed cycle of paper P and also will have rocked arm 192 (Fig. 3) to move bar 111 to the left (also see Fig. 11) to bring the selected register into lower position for receiving an entry of the printed weight.

Thus, the machine will operate correctly when equilibrium of the scale is reached either before the operator depresses the desired register key 104 to start a cycle or after the cycle has gone through 90°.

If, while the scale is still in motion or is vibrating, the operator should disregard the warning of signal lamp 215 and depress a key 104 to start a cycle, then there will be no registration of the load and a printed ticket strip will not be issued. For this purpose, cam shaft 56 carries a cam 231 (Figs. 4 and 21) for closing cam contacts 232 at about 5° of the cycle (see also Fig. 22) and maintaining said contacts closed through the operating period of lever 174. Contacts 232 are without effect unless at the time they close, the scale is still in motion. If the scale is in motion, relay contacts 225a will be closed, the signal lamp circuit will be made, and magnet 226 will be energized. The armature 228 of magnet 226 will be latching lever 174 (Fig. 9) against movement. If the operator now depresses a key 104, a cycle will start, and contacts 232 will close at 5°. With the scale still in motion at 5°, the relay contacts 225a are still closed, and the closing of contacts 232 forms a holding circuit for relay 225, from the positive side of the line, through relay contacts 225a, cam contacts 232, line 235, magnet 225, and to the negative side.

Thus, as long as contacts 232 are closed, relay 225 will remain energized and contacts 225a closed. With contacts 225a closed, the circuits of signal lamp 215 and magnet 226 will be closed, and armature 228 of magnet 226 will continue to latch up lever 174, preventing operation of the latter. Accordingly, a feed cycle of paper P is not initiated and paper is not fed into printing position. The printing hammer 150, however, operates in the normal way under control of cam 155 (Figs. 4, 20, and 22), but since paper is not in printing position, operation of the hammer will not result in printing of the weight on a ticket. Also, operation of the eject rolls 149, under control of cam 169 (Figs. 3, 18, and 22) will not be interfered with, but the paper P not having been fed between the eject rolls, a ticket will not be ejected.

As another result of the latching of lever 174 against operation, under the conditions assumed above, the weight of the load will not be registered. Thus, as a result of failure of lever 174 to operate, the arm 190, its shaft 191, and arm 192 thereof will not operate (see Fig. 3), and bar 111 will not move. Because of failure of bar 111 to move, the pinions 77 of the selected register will not be moved down into entry-receiving coaction with racks 86. Hence, return of the racks will have no effect on the registers and the weight of the load will not be registered.

As the cycle is completed, all the parts are restored to normal, cam contacts 232 have opened, and magnet 226 has been deenergized. In above manner, when the operator improperly depresses a key 104 while the scale is still in motion, a cycle of operations results but the operations during the cycle will not cause issue of a printed ticket or the registering of the weight.

While there have been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a weighing scale including weighing mechanism to weigh an applied load, the combination of printing means, means controlled by the weighing mechanism for setting said printing means to print a record of the applied load on a strip of paper, means for feeding the strip of paper into printing position, means coacting with the printing means to effect printing on the record strip, a cyclical actuator for operating the last-named means, equilibrium sensing means for sensing equilibrium condition of the weighing mechanism, and means controlled thereby for preventing the feed of a record strip into printing position during the cycle of said actuator unless the weighing mechanism has reached equilibrium.

2. In a machine including a weighing mechanism for weighing an applied load, the combination of printing elements settable under control of the weighing mechanism in accordance with the applied load, a platen coacting with the printing elements for effecting printing of the load record on a record strip, means adapted to issue the printed record strip, cyclically operating means for effecting the aforesaid operations of the printing elements and platen, means for sensing the equilibrium condition of the weighing mechanism, and means controlled thereby for preventing issue of a printed record strip unless the weighing mechanism has reached equilibrium before the printing operation has occurred during the cycle of the cyclically operating means.

3. In combination; a carrier movable proportionally to an applied load and provided with elements successively spaced apart a distance equivalent to a certain load unit and one of which, as a result of the movement of the carrier, assumes a position whose distance from an index point is equivalent to that fractional amount of said load unit in excess of an even multiple of such units in the applied load, means for reading the position of the latter element and including a series of stops mounted for movement relatively to each other, means to move said stops in common towards the element in said position to cause one of said stops to engage and be arrested by said latter element in a control plane while the remaining stops continue to move to non-control positions, feeler means movable along said control plane and engaging and stopped by the arrested stop after a differential movement corresponding to the fractional load amount, and manifesting means controlled by the feeler means in accordance with its differential movement for manifesting the fractional load amount.

4. In combination; a carrier movable proportionally to an applied load and provided with elements successively spaced a distance equivalent to a certain load unit and one of which, as a result of the movement of the carrier assumes a position relative to a reference point corresponding to that fraction of the load unit equal to the excess of the applied load over an even multiple of such load units, a series of stops mounted for movement relatively to each other, means for commonly moving said stops towards the latter element whereby one of said stops engages and is arrested by said latter element in a control plane while the remaining stops continue to move to non-control locations, a sensing finger moved transversely to the direction of movement of said stops and along said control plane to engage and be arrested by the stop in the control plane after a differential movement corresponding to the aforesaid fraction of the load unit, and manifesting means controlled by the sensing fingers in accordance with the fractional load.

5. In a weighing scale, a carrier movable proportionally to an applied load and having spaced elements movable along a certain plane and successively spaced apart a distance corresponding to a given load unit and one of which, due to movement of the carrier, assumes a load position spaced from a reference point a distance equivalent to a fractional amount of said load unit, means for reading the load position of the latter element including a series of stops for sensing different fractional amounts of said load unit, said stops being mounted for movement relatively to each other and provided with stop shoulders differentially located with respect to each other in accordance with different fractional amounts of said load unit, said stops being normally disposed along a plane spaced from the plane of said elements, means for moving said stops commonly and after said latter element has taken its load position towards the plane of the elements to cause one of said stops to engage and be arrested by said latter element in a control position while the remaining stops continue to move further to non-control positions, a reading finger moved towards the stop shoulder of the arrested stop in control position to engage the latter shoulder and be stopped thereby after a differential movement corresponding to the fractional amount of load unit represented by the latter stop shoulder, and manifesting means differentially operated under control of the finger and in accordance with the differential operation of the latter.

6. In a weighing scale including weighing mechanism to weigh an applied load; the combination of a manifesting device, an entry effecting member therefor, a driving member for the entry effecting member differentially operated in accordance with the applied load, means for mechanically coupling the aforesaid members to each other to cause the driving member to mechanically drive the entry effecting member to enter a value into the manifesting device in accordance with the differential operation of the driving member, means for sensing the equilibrium condition of the weighing mechanism, and means controlled by the equilibrium sensing means for preventing the mechanical coupling of the members to each other before the weighing mechanism reaches equilibrium.

7. In a scale such as defined in claim 6, a cyclically operating mechanism for operating the driving member to cause the latter to drive the entry effecting member, and means for initiating the cycle of said cyclically operating mechanism, the latter mechanism, during its cycle, operating the driving member idly in the event the entry effecting member has not been coupled to the driving member due to failure of the weighing mechanism to reach equilibrium during the cycle.

EDWARD J. VON PEIN.